(12) United States Patent
Wu et al.

(10) Patent No.: US 7,692,895 B1
(45) Date of Patent: Apr. 6, 2010

(54) EXCHANGE BIASED POLE FOR REDUCING THE LIKELIHOOD OF DOMAIN LOCKUP IN PERPENDICULAR RECORDING

(75) Inventors: Yan Wu, Cupertino, CA (US); Gang Herbert Lin, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 302 days.

(21) Appl. No.: 11/401,208

(22) Filed: Apr. 10, 2006

Related U.S. Application Data

(60) Provisional application No. 60/669,992, filed on Apr. 11, 2005.

(51) Int. Cl.
*G11B 5/147* (2006.01)
(52) U.S. Cl. ................................. 360/125.08
(58) Field of Classification Search ............ 360/125.01, 360/125.03, 125.08, 125.24, 125.45
See application file for complete search history.

(56) References Cited

U.S. PATENT DOCUMENTS

| 5,287,237 | A  | * | 2/1994  | Kitada et al. ............ 360/327.32 |
|-----------|----|---|---------|--------------------------------------|
| 5,910,870 | A  | * | 6/1999  | Ishiwata ..................... 360/317 |
| 6,980,406 | B2 |   | 12/2005 | Gill                                 |
| 7,372,664 | B1 | * | 5/2008  | Mallary et al. ......... 360/125.01   |
| 2002/0135935 | A1 | * | 9/2002 | Covington .................. 360/126  |
| 2003/0197976 | A1 | * | 10/2003 | Van der Heijden et al. .. 360/125 |
| 2005/0013044 | A1 | * | 1/2005 | Hirata et al. ................ 360/125 |
| 2006/0044680 | A1 |   | 3/2006  | Liu et al.                          |
| 2006/0119981 | A1 | * | 6/2006 | Li et al. ...................... 360/125 |

\* cited by examiner

*Primary Examiner*—Angel A. Castro
(74) *Attorney, Agent, or Firm*—Kinney & Lange, P.A.

(57) ABSTRACT

A magnetic head for perpendicular recording includes a main pole having a first end and a second end. Coils are positioned with respect to the main pole. A return pole forms first and second return paths for magnetic flux extending from the second end of the main pole. The main pole includes an anti-ferromagnetic layer to pin a remnant magnetic moment in the horizontal direction.

20 Claims, 4 Drawing Sheets

EXCHANGE BIASED POLE FOR REDUCING THE LIKELIHOOD OF DOMAIN LOCKUP IN PERPENDICULAR RECORDING

CROSS-REFERENCE TO RELATED PATENT APPLICATIONS

Embodiments of the present invention relate to U.S. Provisional Application Ser. No. 60/669,992, filed Apr. 11, 2005, entitled "Exchange Biased Pole for Reducing the Likelihood of Domain Lockup in Perpendicular Recording", the contents of which are incorporated by reference herein and which is a basis for a claim of priority.

BACKGROUND OF THE INVENTION

1. Field of the Invention

Embodiments of the present invention relate generally to the storage and retrieval of data within a magnetic recording medium. In particular, embodiments of the present invention relate to the structure of a main pole of a magnetic head for perpendicular recording to control the domain lockup phenomenon and a process of manufacturing the main pole.

2. Related Art

One approach to increase the areal recording density of a magnetic recording medium is to use a perpendicular recording method, instead of the conventional longitudinal magnetic recording method. In magnetic perpendicular recording, a magnetic head is designed to direct magnetic flux through the recording layer of the magnetic recording medium in a direction which is generally perpendicular to the plane of the magnetic recording medium. Typically the magnetic recording medium for perpendicular recording has a hard magnetic recording layer and a magnetically soft underlayer. The perpendicular recording method offers an advantage in that microscopic recorded magnetization is thermally stable.

A magnetic head for perpendicular recording generally includes two portions, a write head portion or head for writing or programming magnetically-encoded information on the magnetic recording medium or disc and a reader portion for reading or retrieving the stored information from the magnetic recording medium.

The write head or recording head in a disc drive using a perpendicular recording method typically includes a main pole and a return pole which are magnetically separated from each other at an air bearing surface (ABS) of the writer by a nonmagnetic gap layer, and which are magnetically connected to each other at a region away from the ABS at a back gap closure reading called a yoke. In FIG. 1, an angled side view of a portion 10 of a perpendicular recording head is shown to include a main pole 12, a coil(s) 14 and a return pole 16. The main pole 12 and the return pole 16 form a U-shape around the coil 14. In operation, current flows through the coil 14 creating a magnetic field between the main pole 12 and the return pole 14. When programming or storing information onto a magnetic recording medium, magnetically-encoded information is written by creating a magnetic path from the main pole 12 to the medium and back to the return pole 16 to close the loop.

This structure is a single-pole write head because, while a main pole and return pole are referred thereto, the return pole is not physically a pole. Rather, the return pole serves to close the loop with the main pole through the soft underlayer of the magnetic recording medium.

To write data to the magnetic recording medium, an electrical current is caused to flow through the conductive coil 14, thereby inducing a magnetic field across the gap between the main pole 12 and return pole 16. Both the main pole 12 and return pole 16 generate a magnetic field in the magnetic recording medium during recording when the write current is applied to the coils 14. A magnetic moment of the main pole 12 should be oriented along an easy axis parallel to the ABS without a write current field from the write coils 14.

When the magnetic moment does not return to an orientation parallel to the ABS after being subjected to multiple instances of the write current field, the main pole 12 is not stable. Therefore, in an unstable pole, the orientation of the magnetic moment might remain nonparallel to the ABS position even after current to the write coils 14 is turned off. A moment that exists in the absence of a magnetic field is referred to as a remnant moment. The domain pole lockup phenomenon is created when there is a remnant moment in the perpendicular direction. Accordingly, the remnant magnetic field of the main pole 12 may cause erase-after-write or undesirable erasure of information from the magnetic recording medium.

Generally, the narrower the main pole 12, the more bits can be written per unit area on to a medium. However, use of a narrow main pole has been known to introduce a large shape anisotropy, which can cause pole lockup and undesired erasure of valid data stored in the medium.

FIG. 2 shows an example of a single narrow main pole at 18. Shape anisotropy itself dictates the easy axis of magnetization to be along the long direction as indicated by 20. In high density recording, such as perpendicular recorders or heads, a narrow main pole 12 is preferable, such as that shown in FIG. 2, however, as stated earlier, the problem then becomes undesirable erasure due to the possible presence of a large remnant field. Thus, when programming or writing is performed and the head is shut off or not being employed for storage, the effects of a remnant field or a residual field preside.

One conventional technique for reducing the remnant moment of the narrow pole is to laminate the pole (which is made of a high moment magnetic material such as cobolt-iron) into multiple layers. The most recent lamination scheme utilizes anti-ferromagnetic coupling (AFC) between layers. The drawback with the AFC lamination schemes is that they are complicated and difficult to manufacture.

Thus, the need arises for improvements to the structure of the main pole of a perpendicular recorder or write head that effectuates low remnant magnetization to alleviate the pole lockup phenomenon that is simple in construction and does not increase the overall size of the recording device.

SUMMARY OF THE DISCLOSURE

Embodiments of the present invention address the problems described above and relate to the structure of a magnetic head for perpendicular recording and a process of manufacturing the magnetic head in order to prevent domain lockup in the vertical direction and thus avoiding the pole erasure problem. The magnetic head includes a main pole having a first end and a second end. Coils are positioned with respect to the main pole. A return pole forms first and second return paths for magnetic flux extending from the second end of the main pole. The main pole includes an anti-ferromagnetic material layer to pin a remnant (magnetic induction remaining in a material after removal of the magnetic force) magnetic moment in the horizontal direction.

DETAILED DESCRIPTION OF PREFERRED EMBODIMENTS

Figure 3:
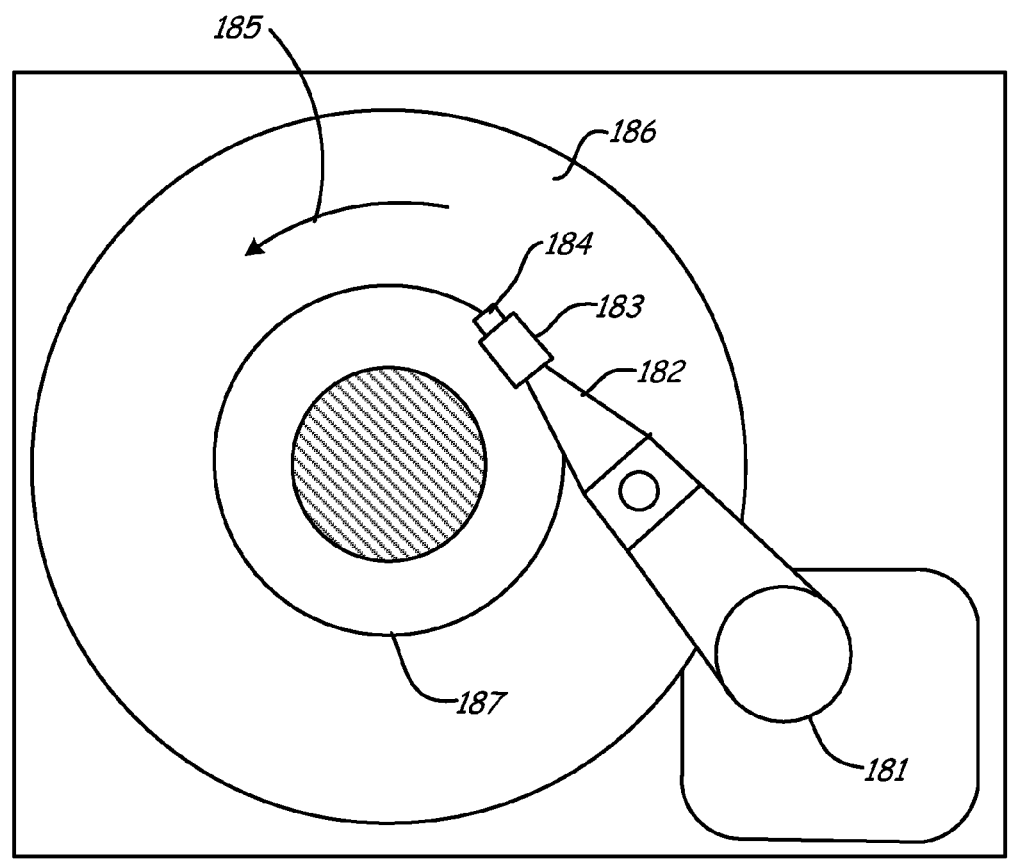
FIG. 3 is a diagram which shows a magnetic recording medium apparatus according to one embodiment of the present invention.

An explanation will be given below regarding embodiments of the present invention while referring to the attached drawings. FIG. 3 is a schematic view showing a magnetic recording medium apparatus, such as, but not limited to, a disk drive apparatus representing an embodiment of the present invention. A slider 183 is fixed at the tip of a suspension arm 182 supported by a rotary actuator 181. A supporting mechanism, referred to as one or more gimbals (not shown), is at the tip of the suspension arm 182. The slider 183 is fixed through the gimbals to the suspension arm 182. Data is written to or read from a medium 186 which rotates in an indicated rotational direction 185, through a magnetic head element 184 provided at the tip of the slider 183. According to one embodiment of the present invention, the recording head element 184 uses a single-pole type head for writing and a magnetoresistive effect head for reading.

The magnetic recording medium apparatus is not limited to having only a single recording medium 186, but may have a plurality of recording media. Also, data may be written to both the top surface and the bottom surface of each recording medium, in which case, a different type of magnetic head element is required for each surface. The magnetic head element 184 may have a single element for performing both reading and writing, or as stated above, the magnetic head element 184 may have separate elements for performing each of those operations.

Figure 4:
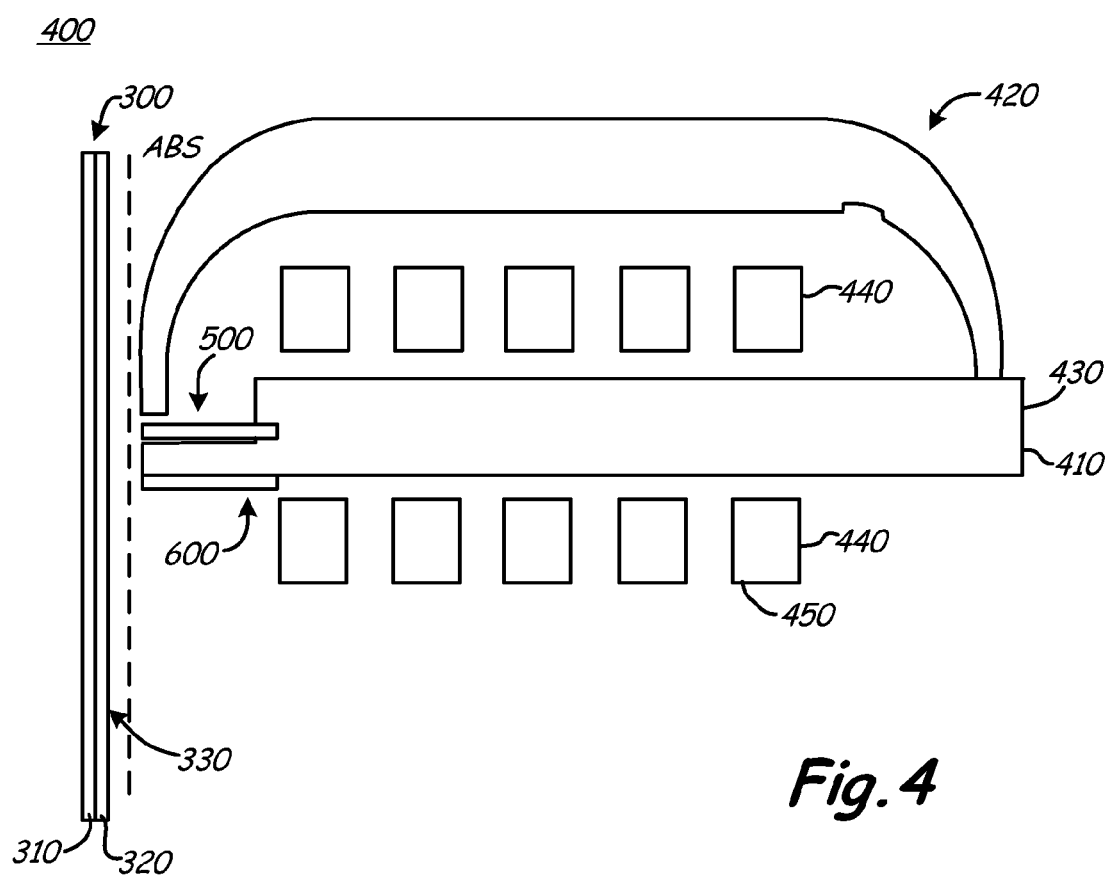
FIG. 4 is a cross-sectional side view of a perpendicular magnetic recording head according to one embodiment of the present invention.

FIG. 4 illustrates a cross-sectional side view of a perpendicular magnetic recording head 400 according to one embodiment of the present invention. The cross-sectional view of FIG. 4 is taken along a plane normal to an air bearing surface (ABS) of the perpendicular magnetic recording head 400.

The ABS of the perpendicular magnetic recording head 400 faces the surface 330 of the magnetic recording medium 300. A space between the ABS of the perpendicular magnetic recording head 400 and the surface 330 of the magnetic recording medium 300 is preferably minimized, while avoiding contact between the perpendicular magnetic recording head 400 and the magnetic recording medium 300.

Magnetic recording medium 300 may be a double layer perpendicular recording medium including a recording layer 320 and a soft underlayer 310. The recording layer 320 is typically formed of one or more hard magnetic materials and may include multilayer structures, while the soft underlayer 310 is typically formed from soft magnetic materials.

Perpendicular magnetic recording head 400 includes a main pole 410, one or more coil(s) 440, a return pole 420 and a yoke 430. The coils 440 are provided with a conducting material 450. The return pole 420 is connected to the yoke 430, at an end of the yoke 430 that is away from the air bearing surface of the perpendicular magnetic recording head 400. One set of coils 440 is positioned between the return pole 420 and the main pole 410 with the adjacent yoke 430.

Return pole 420 is formed from soft magnetic materials such as but not limited to NiFe or the like. The sets of coils 440 are made from materials with low electrical resistance such as, for example, Cu or the like. Main pole 410 is made from a high moment soft magnetic material such as CoFe or the like. Adjacent yoke 430 is made from a soft magnetic material, such as NiFe or the like, to improve the efficiency of flux delivery to the main pole 410.

Although not shown, the perpendicular magnetic recording head 400 may also include one or more shorting shields made of a soft magnetic material such as NiFe or the like, located at an air bearing surface of the perpendicular magnetic recording head 400.

Perpendicular magnetic recording head 400 may comprise a one coil design or a two-coil design. Perpendicular magnetic recording head 400 is presented in FIG. 4 with a two-coil design, but may be modified to include alternative coil designs including a one coil design with a single coil helically wrapped around main pole 410. The two-coil design includes a set of coils to carry current into the medium and a second set of coils to carry current out of the medium 300, in effect letting current flow with opposite polarities. The effect is an efficient driving force to the main pole 410 and yoke 430, with reduction of the net driving force (MMF) on the return pole 420 as compared to the one coil design.

According to one embodiment of the present invention and as illustrated in FIG. 4, the perpendicular magnetic recording head 400 further includes either a top anti-ferromagnetic material (AFM) layer 500 or a bottom AFM layer 600. The AFM layers each are used to pin (bind or hold) the remnant magnetic moment in the main pole tip in the horizontal direction to avoid magnetic domain lockup in the vertical direction, thus avoiding a pole erasure problem. According to an embodiment of the present invention, the pinning could be achieved through ferromagnetic or ferrimagnetic materials as well, within a direct exchange mode or through another exchange coupling layer. In such embodiments, the layers 500 and 600 may be composed of PtMn, IrMn, or the like for a direct exchange mode or PtMn/FeCo/Ru or the like for an indirect exchange mode.

Figure 5:
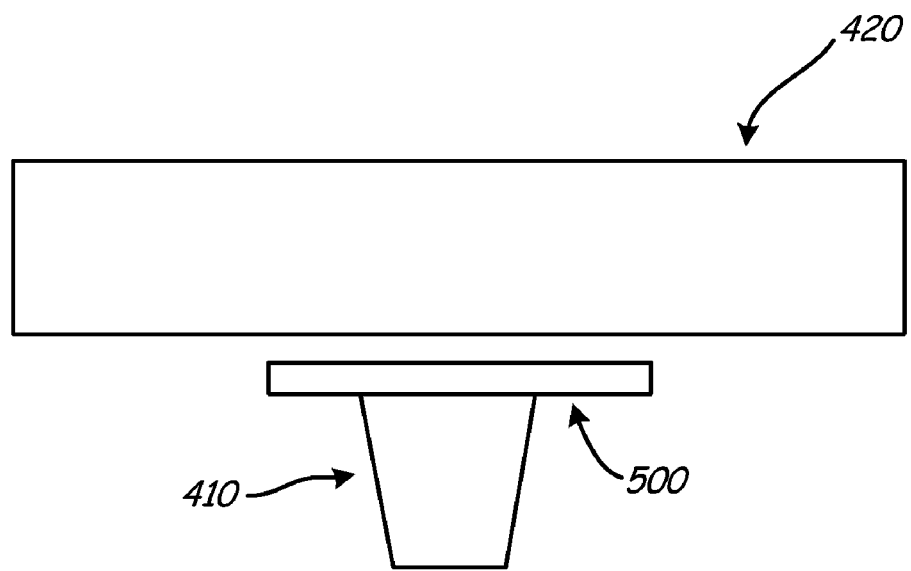
FIG. 5 is a partial ABS view of a perpendicular magnetic recording head according to one embodiment of the present invention.
Figure 6:
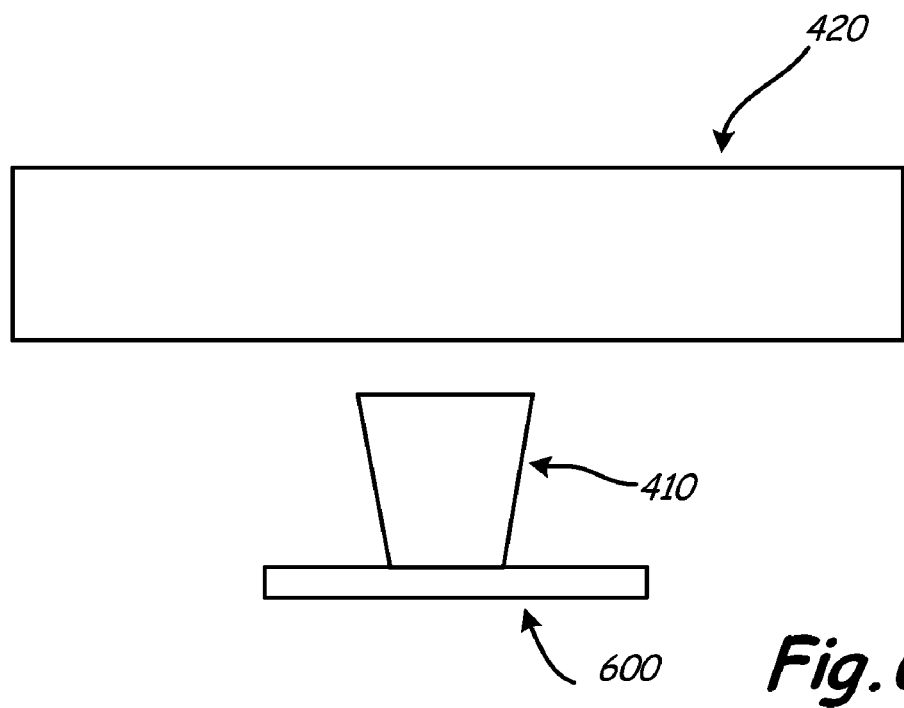
FIG. 6 is a partial ABS view of a perpendicular magnetic recording head according to another embodiment of the present invention.

FIGS. 5 and 6 are partial ABS views of the perpendicular magnetic recording head 400 according to embodiments of the present invention. As illustrated in FIG. 5, top AFM layer 500 is provided between main pole 410 and return pole 420. In an alternative embodiment illustrated in FIG. 6, bottom AFM layer 600 is provided under main pole 410. To better appreciate the functions of the top AFM layer 500 and the bottom AFM layer 600 a discussion of the operation of the perpendicular magnetic recording head 400 is provided below.

To write data to the perpendicular magnetic recording medium 300, a time-varying write current is caused to flow through the coils 440, which in turn produces a time-varying magnetic field through the main pole 410 and the return pole 420. The magnetic recording medium 300 is then passed by the ABS of the perpendicular magnetic recording head 400 at a predetermined distance such that the magnetic recording medium 300 is exposed to a magnetic field.

A closed magnetic path for flux from the perpendicular magnetic recording head 400 to the magnetic recording medium 300 travels from the main pole 410, through the recording layer 320 of the magnetic recording medium 300 to the soft underlayer 310 and returns to the perpendicular magnetic recording head 400 through the return pole 420, again passing through the recording layer 320.

Figure 1:
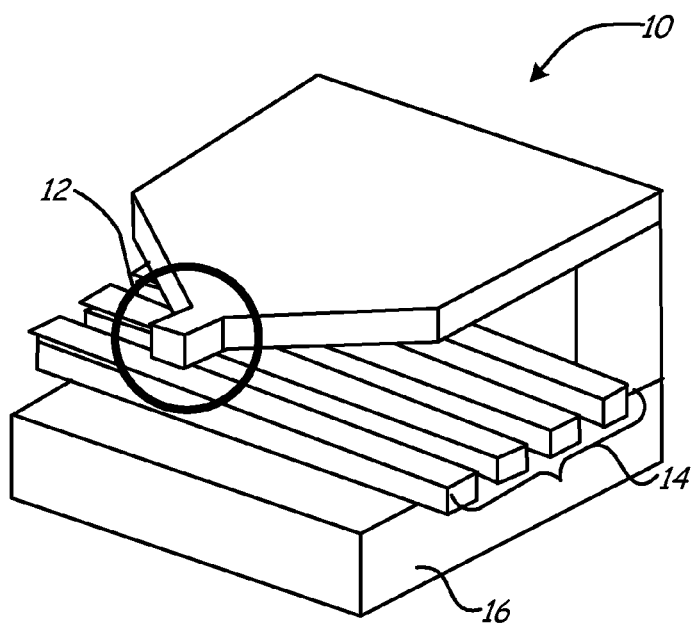
FIG. 1 shows an angled side view of a portion of a conventional perpendicular recording head including a main pole, coil(s) and a return pole.
Figure 2:
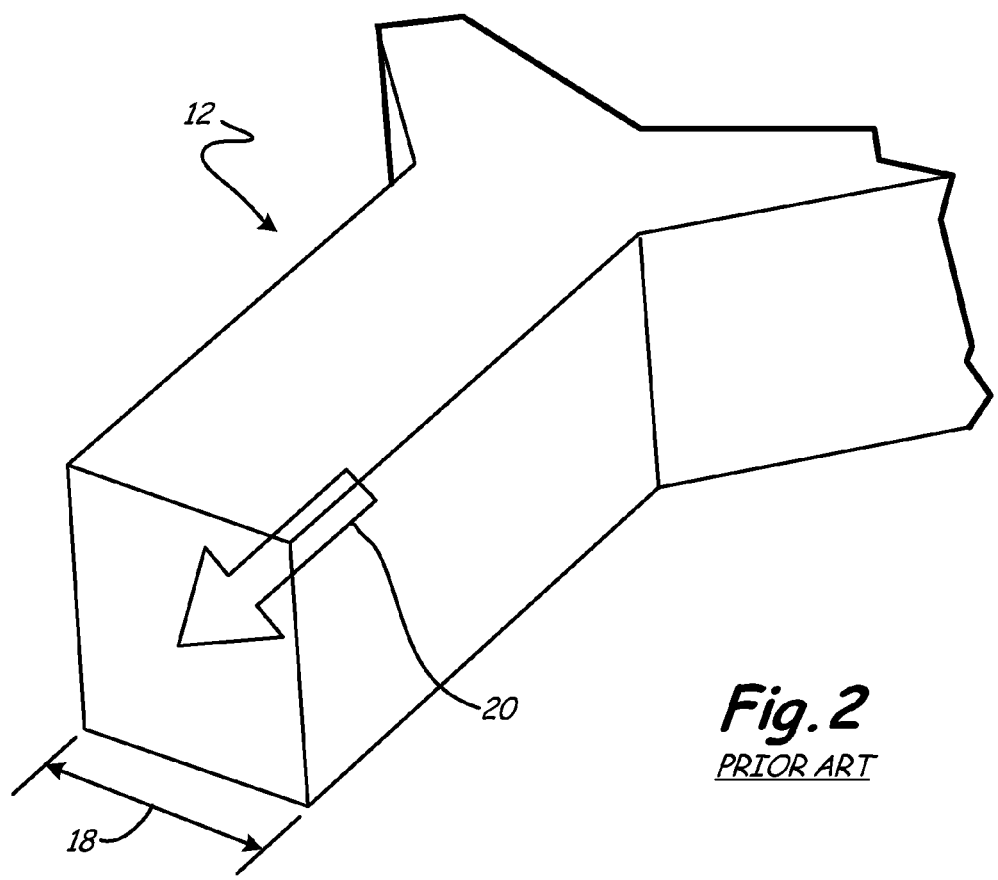
FIG. 2 shows an example of a conventional narrow main pole.

Referring back to FIG. 2, after recording, even after the current has been shut off, a large remnant field would have existed because of a single magnetic orientation or domain 20. To ensure data is not erased because of the large remnant field, either the top AFM layer 500 or the bottom AFM layer 600 is provided to adjust the magnetic orientation to a desired or biased orientation. Thus, the domain 20 would be orientated in substantially the horizontal direction instead of the vertical direction as shown in FIG. 2. In this manner, the strength of the magnetic field affecting the recording layer 320 will not cause erasures. In one embodiment of the present invention, the thickness of either the top AFM layer 500 or the bottom AFM layer 600 is about 3 to about 100 nanometers, although, in other embodiments, other thicknesses may be employed without departing from the scope and spirit of the present invention. In various embodiments, magnetization of the top AFM layer 500 or the bottom AFM layer 600 can be fixed by heating the structure above the blocking temperature and then cooling it in the presence of a magnetic field.

According to alternative embodiments of the present invention, the top AFM layer 500 and the bottom AFM layer 600 may be modified in width, length and location. For example, the distance between the top AFM layer 500 and the return pole 420 may be modified with in the range of approximately 10 to 500 microns. Additionally, either or both of the AFM layers 500 and 600 may be recessed from the air bearing surface.

According to embodiments of the present invention, the main pole can take on many different shapes and designs and is not limited to the shapes or designs illustrated in drawings and described in the specification. For example the main pole can have a substantially rectangular, square, oval, circular, triangular or polygonal shape.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A magnetic head for perpendicular recording, comprising:
   a main pole having a first end and a second end, the main pole comprising a soft magnetic material layer;
   at least one coil positioned with respect to the main pole; and
   a return pole forming a return path for magnetic flux extending from the second end of the main pole;
   wherein the soft magnetic material layer has a first side adjacent an anti-ferromagnetic material layer to pin a remnant magnetic moment of the main pole in a horizontal direction parallel to an air bearing surface of the main pole; and
   wherein the soft magnetic material layer has a second side opposite the first side, the second side adjacent a non-magnetic gap layer.

2. The magnetic head according to claim 1, wherein the anti-ferromagnetic material layer is provided above the main pole, between the main pole and the return pole.

3. The magnetic head according to claim 1, wherein the anti-ferromagnetic material layer is provided below the main pole, opposite the return pole.

4. The magnetic head according to claim 1, further comprising a yoke provided between the main pole and the return pole, adjacent the main pole.

5. The magnetic head according to claim 1, further comprising an insulator around the at least one coil.

6. The magnetic head according to claim 1, wherein the main pole includes high moment magnetic materials.

7. The magnetic head according to claim 1, wherein the main pole has a uniform composition.

8. The magnetic head according to claim 1, wherein the anti-ferromagnetic material layer is recessed from the air bearing surface of the main pole.

9. The magnetic head according to claim 1, wherein the soft magnetic material layer has an easy axis in a vertical direction perpendicular to the air-bearing surface of the main pole, and wherein the soft magnetic material layer pins the remnant magnetic moment in a horizontal direction perpendicular to the easy axis.

10. A method for manufacturing a magnetic head, comprising:
    providing a main pole having a first end and a second end, the main pole comprising a soft magnetic material layer;
    positioning coils with respect to the main pole;
    forming a return pole for magnetic flux extending from the second end of the main pole; and
    pinning a remnant magnetic moment of the main pole in a horizontal direction parallel to an air bearing surface of the main pole using an anti-ferromagnetic layer adjacent a first side of the soft magnetic material layer;
    wherein the soft magnetic material layer has a second side opposite the first side, the second side adjacent a non-magnetic gap layer.

11. The method for manufacturing a magnetic head according to claim 10, further comprising providing the anti-ferromagnetic layer above the main pole, between the main pole and the return pole.

12. The method for manufacturing a magnetic head according to claim 10, further comprising providing the anti-ferromagnetic layer below the main pole, opposite the return pole.

13. The method for manufacturing a magnetic head according to claim 10, further comprising providing a yoke between the main pole and the return pole.

14. The method for manufacturing a magnetic head according to claim 10, further comprising forming the main pole with high moment magnetic materials.

15. A disk drive device comprising:
    at least one magnetic recording medium;
    at least one magnetic head supported for perpendicular recording on the at least one magnetic recording medium; each magnetic head comprising:
        a main pole having a first end and a second, the main pole comprising a soft magnetic material layer having an easy axis in a vertical direction perpendicular to an air-bearing surface of the main pole;
        at least one coil positioned with respect to the main pole; and
        a return pole forming a return path for magnetic flux extending from the second end of the main pole;

wherein the soft magnetic material layer has a first side adjacent an anti-ferromagnetic layer to pin a remnant magnetic moment of the main pole in a horizontal direction parallel to the air-bearing surface of the main pole and perpendicular to the easy axis; and wherein the soft magnetic material layer has a second side opposite the first side, the second side adjacent a nonmagnetic gap layer.

16. The disk drive device according to claim 15, wherein the anti-ferromagnetic material layer is provided above the main pole, between the main pole and the return pole.

17. The disk drive device according to claim 15, wherein the anti-ferromagnetic material layer is provided below the main pole, opposite the return pole.

18. The disk drive device according to claim 15, further comprising a yoke provided between the main pole and the return pole.

19. The disk drive device according to claim 15, further comprising an insulator around the at least one coil.

20. The disk drive device according to claim 15, wherein the main pole includes high moment magnetic materials.

* * * * *